Oct. 16, 1951   P. G. STANLEY   2,571,628
APPARATUS FOR MEASURING THE SIZE OF BAGS
Filed Feb. 28, 1947   3 Sheets-Sheet 2
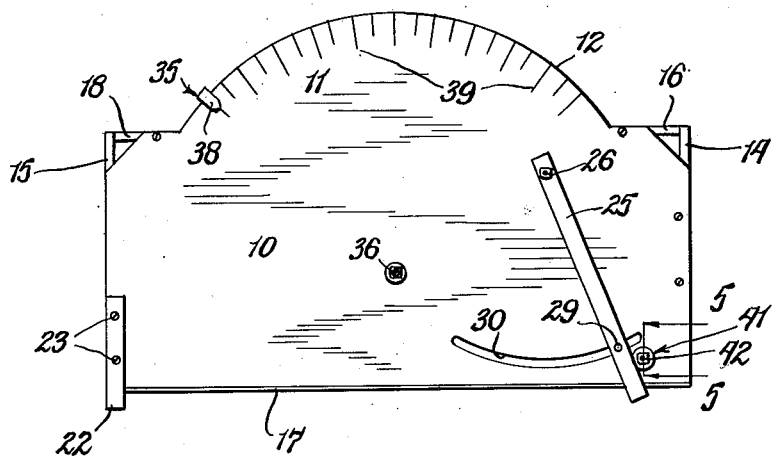
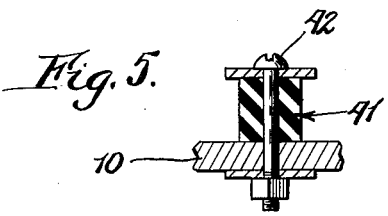
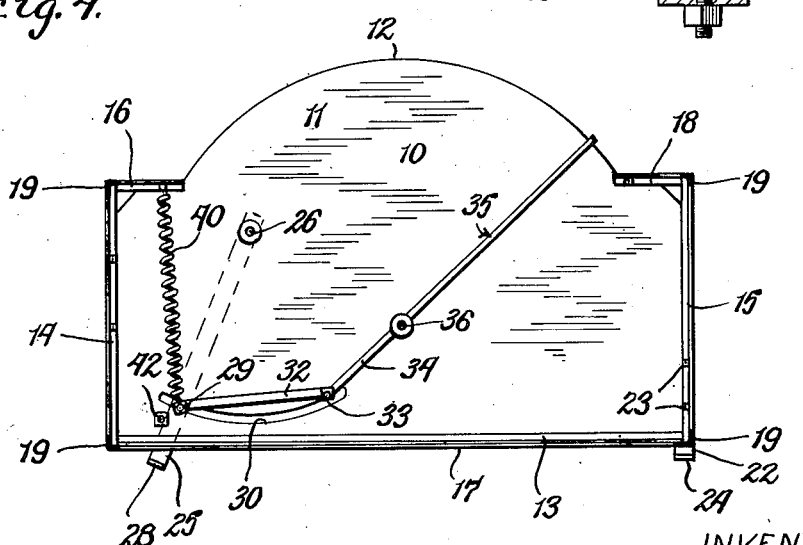

Oct. 16, 1951 P. G. STANLEY 2,571,628
APPARATUS FOR MEASURING THE SIZE OF BAGS
Filed Feb. 28, 1947 3 Sheets-Sheet 3

INVENTOR.
Pierce G. Stanley
BY Popp and Popp
ATTORNEYS.

Patented Oct. 16, 1951

2,571,628

UNITED STATES PATENT OFFICE 2,571,628

APPARATUS FOR MEASURING THE SIZE OF BAGS

Pierce G. Stanley, Buffalo, N. Y.

Application February 28, 1947, Serial No. 731,599

9 Claims. (Cl. 33—148)

This invention relates to an apparatus for measuring the size of bags and more particularly to apparatus for facilitating the sorting of used cloth bags of different sizes, such used cloth bags, after having been cleaned, being sorted and bundled as to size, so that each bundle can be used with standard bag filling machinery set to fill one particular size of bag.

The principal object of the present invention is to provide a very simple and inexpensive device which materially reduces the manual labor involved in sorting cloth bags as to size.

Another object of the invention is to provide such apparatus which directly indicates the size of the bag applied thereto, thereby to relieve the operator from mental effort and to facilitate placing the bag in proper piles for bundling.

Another object of the invention is to provide such apparatus which is convenient and simple in its use, and adapted for use.

Another object is to provide such apparatus which is light in weight and readily portable so that it can be readily moved around to suit particular operating conditions.

Another object is to provide such apparatus which is simple and sturdy in construction and which will stand up under conditions of severe and constant use without getting out of order or requiring repair.

Other objects of the invention will appear from the following description and drawings in which:

Fig. 3 is a top plan view thereof.

Fig. 4 is a bottom plan view thereof.

Fig. 5 is an enlarged fragmentary vertical section taken on line 5—5, Fig. 3.

Figure 1:
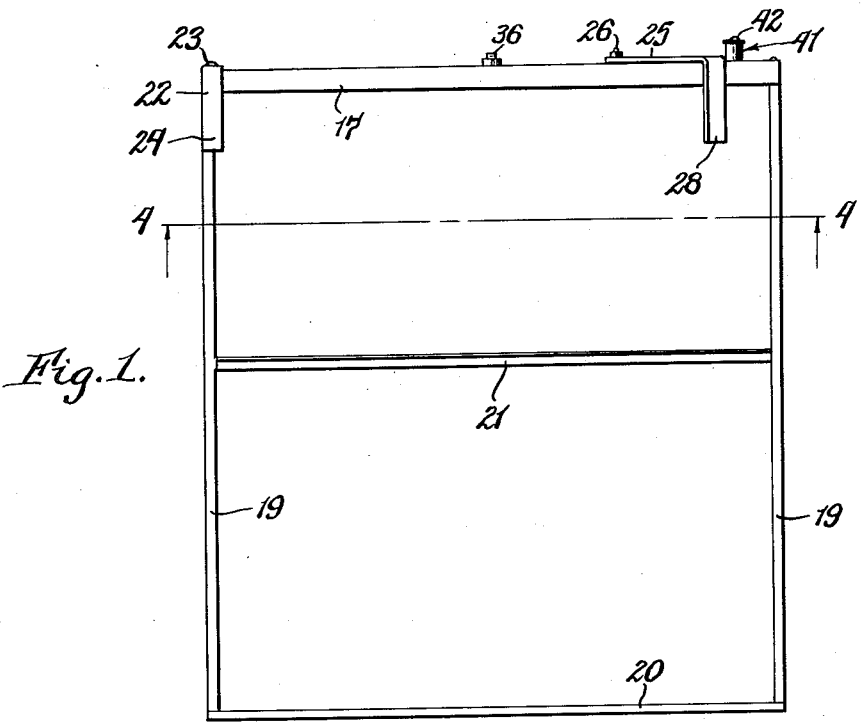
Fig. 1 is a front elevational view of a device for measuring bags embodying the present invention.
Figure 2:
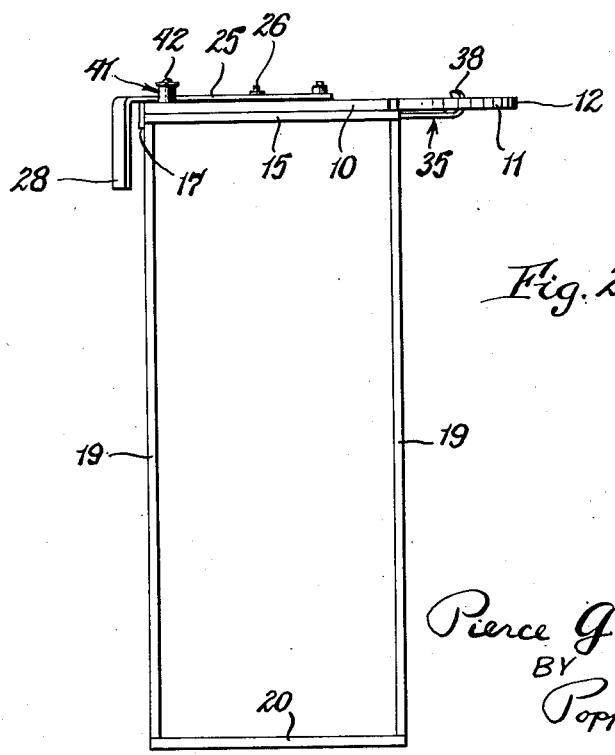
Fig. 2 is an end elevational view thereof, viewed from the left hand end of Fig. 1.

In the form of the invention shown in Figs. 1–5, the apparatus is generally in the form of a high table having an elevated support or top panel 10 which is of rectangular shape in front and has a rearwardly projecting central part 11 with an arcuate edge 12, this arcuate edge 12 being concentric with the axis of rotation of a pointer, as hereinafter described. The front straight edge of the panel 10 shown as reinforced by an angle iron 13; the side edges are shown as reinforced by angle irons 14 and 15; and the rear straight edges are shown as reinforced by angle irons 16 and 18, these angle irons being secured to the underside of the panel 10 along its straight edges in any suitable manner, and these angle irons being shown as being welded together. The front edge of the panel is shown as further reinforced and improved in appearance by a facing strip 17. The corners of the frame formed by these angle irons are supported by four legs 19, the upper ends of which are shown as welded to the depending flanges of these angle irons at the corners thereof and these legs being shown as supported on a rectangular angle iron frame 20 which can be secured to the floor. One or more additional cross members 21 can be provided in the stand for the table top 10.

At one lateral side of the structure an L-shaped bar 22 is secured to the top panel 10 by bolts 23, and which are shown as anchored in the angle iron 15. This bar 22 is shown as arranged on top of the panel 10 along the edge defined by the angle iron 15 and as projecting forwardly beyond the facing strip 17. This projecting front end of the bar 22 is bent downwardly to provide a depending arm 24 and which is adapted to receive the mouths of the bags to be sorted as to size.

A movable L-shaped bar 25 is shown as pivotally secured in the top panel 10 by bolt 26 passing through this top panel, this pivot bolt being arranged toward the rear of the top panel 10 and on the lateral side thereof opposite from the fixed bar 22. The movable bar 25 extends forwardly over the facing strip 17 and has its forward and outer end bent downwardly, as indicated at 28, this downwardly bent part being preferably of substantially the same size as the downwardly bent part 24 of the fixed bar 22. The movable bar 25 carries a pin 29 which extends downwardly through an arcuate slot 30 provided in the top panel 10, this arcuate slot 30 being, of course, concentric with the pivot 26 for the movable arm 25. This pivot pin 29 is connected, below the top panel 10, with a horizontal link 32 which is arranged under the top panel 10 and has its other end pivotally connected as indicated at 33 with one end 34 of a pointer 35, this pointer being pivotally secured intermediate its ends to the under side of the top panel 10 by means of a bolt 36, or in any other suitable manner, this bolt 36 being concentric with the curved edge 12 at the rear of the top panel 10. The rear end of the pointer 35 is bent to embrace the curved edge 12 of the top panel and provide a pointer 38 which is arranged above the top panel 10 and directed toward its pivot bolt 36. This pointer traverses the graduations of a scale 39. It will be understood that this scale can be calibrated in any manner to conform to bag sizing.

Means are provided for yieldingly holding the free end of the movable bar 25 away from the fixed bar 22. For this purpose a helical tension spring 40 is shown as connected at one end to the pin 29 carried by the movable bar 25, and at its other end to the angle iron 16, this spring being arranged under the top panel 10. This spring yieldingly holds the free end of the movable arm in engagement with a rubber bumper 41. This rubber bumper can be of any suitable form and is shown as secured to project upwardly from the top panel 10 by means of a bolt 42, suitable washers being provided as best shown in Fig. 5. This rubber bumper 41 is so arranged that when it engages the movable bar 25 the pointer 38 is at one extreme end of scale 39.

In the use of the apparatus, the operator takes the bag to be measured and slips the mouth of this bag upwardly around the downwardly bent part 28 at the forward and outer end of the movable arm 25. The operator then draws the bag to the left, as viewed in Figs. 1 and 3, and slips the mouth of the bag around the depending part 24 of the fixed bar 22. The mouth of the bag is thereby held in a distended condition between the depending parts 24 and 28 of the fixed and movable bars 22 and 25, respectively, this distended condition being maintained by the helical spring 40 which is connected to the pin 29 on the movable arm 25 and which is anchored so as to draw this movable arm to the right, as viewed in Figs. 1 and 3. In so applying a bag to the depending ends of the fixed and movable bars 22 and 25, the movable bar 25 is swung away from the bumper 41 and its pin 29 is moved along the arcuate slot 30 and moves the link 39. Since the opposite end of this link is connected to the end 34 of the pointer 35, and since this pointer is pivoted concentric with the curved edge 12 of the top panel 10, the pointer is moved along the scale 39 and when the bag is held distended between the downwardly bent parts 24 and 28 of the fixed and movable bars 22, 25, respectively, the pointer 38 is at that calibration corresponding to the particular size of the bag so held. Thus, if the bag is, say a 14 inch bag, the pointer will be at a corresponding graduation of the scale 39, and if the bag is a 20 inch bag, it will again be at a corresponding graduation of the scale 39. The operator can therefore look at the pointer 38 and scale 39 and instantly determine the size of the bag so applied to the bent ends 24 and 28 of the fixed and movable bars 22, 25, respectively. The operator then pulls the bag downwardly from these downwardly bent ends 24 and 28 of the fixed and movable bars 22 and 25, respectively, and throws the bag in a corresponding pile, these piles being subsequently bundled to provide bundles of bags all having the same size of mouth.

When the bag is so withdrawn from the downwardly bent ends 24 and 28 of the fixed and movable bars 22, 25, respectively, the movable bar 25 swings back into engagement with the bumper 41. This return movement is provided by the return spring 40 which urges the movable arm 25 to the right as viewed in Figs. 1 and 3. This return movement of the movable arm 25 through the link 32, swings the pointer 34 so as to bring its pointer end 38 back to the extreme end of the scale 39, the apparatus thereby being placed in condition for measuring another bag.

Figure 7:
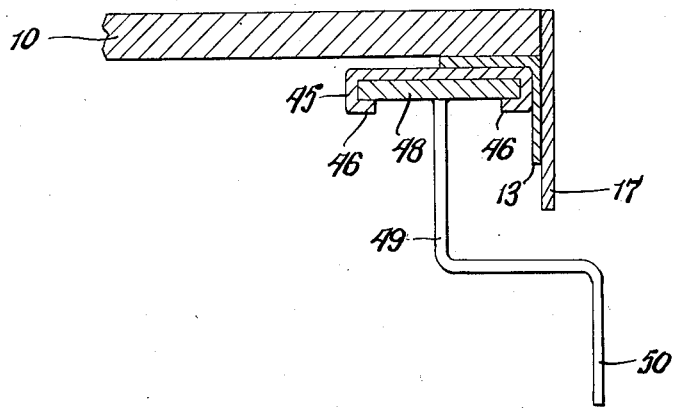
Fig. 7 is an enlarged vertical section taken on line 7—7, Fig. 6.
Figure 6:
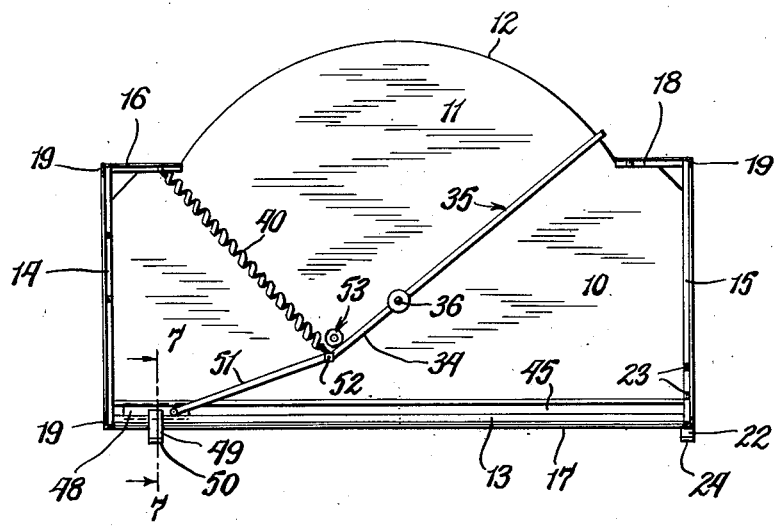
Fig. 6 is a bottom plan section similar to Fig. 4 and showing a modified form of the invention.

In the form of the invention shown in Figs. 6 and 7 a metal channel or track 45 is secured to the underside of the angle iron 13 which extends along and reinforces the front edge of the top panel 10. As best shown in Fig. 7, this channel is C-shaped in cross section, the flanges thereof terminating in opposing flanges 46 and in this channel or track is arranged a slider 48. To this slider is welded a movable bar 49, this movable bar extending downwardly and thence outwardly to a position beyond the front edge of the top panel 10 and having its extremity 50 bent downwardly. This slider is pivotally connected by a link 51 with the rear end 34 of the pointer 35, this pointer being identical with the pointer in the form of the invention shown in Figs. 1–5 and hence the same reference numerals being employed.

In the form of the invention shown in Figs. 6 and 7 the return spring 40 is connected with the pivot bolt 52 between the link 51 and the end 34 of the pointer 35, this spring normally holding the end 34 of the pointer against a rubber stop 53 which can be of the same form as the rubber stop 41 shown in Fig. 5, except that it is mounted on the underside of the top panel 10. In other respects the form of the invention shown in Figs. 6 and 7 is the same as that shown in Figs. 1–5 and hence the same reference numerals have been employed.

In using the form of the invention shown in Figs. 6 and 7, the mouth of the bag is caught at one side by the downwardly bent end 50 of the movable arm 49 and then the mouth of the bag is distended toward the downwardly bent end 24 of the fixed arm 22 and the bag and movable arm 49, 50 drawn toward this fixed arm until its mouth can be slipped up around this fixed arm 24. In so moving the movable arm 49, the slider 48 is drawn along the track or channel 45 a corresponding distance, this, through the link 51, swinging the pointer 35 so that its pointer end 38 is brought to a corresponding graduation on the scale 39. Since the return spring 40 tends to hold the fixed and movable arms 22, 49 apart, the graduation of the scale 39 so indicated by the pointer end 38 of the pointer 35 is an indication of the size of the bag and hence the operator noting this can pull the bag downwardly from the depending parts 24, 50 of the fixed and movable arms 22, 49, respectively, and throw the bag in a pile corresponding to its size.

From the foregoing it will be seen that the present invention provides a very simple and rugged apparatus for measuring bags according to their mouth size and greatly reduces the labor required in separating bags according to their size as a part of the cleaning operation thereof.

I claim:

1. Apparatus for sorting bags as to size, comprising a table including a horizontal top panel and legs supporting said top panel, a bar fixed to said top panel to overhang one side thereof and projecting forwardly therefrom and thence downwardly to provide a downwardly projecting end, a movable bar pivoted to said top panel to overhang said one side thereof and to swing about a vertical axis and projecting forwardly therefrom and thence downwardly to provide a downwardly projecting end, a pointer movably mounted on said top panel to swing about a vertical axis and traversing a scale, means operatively connecting said movable bar and pointer whereby the size of the mouth of a bag held distended between said downwardly projecting ends of said fixed and movable bars is indicated on said scale by said pointer, and means yieldingly holding said fixed and movable bars apart.

2. Apparatus for sorting bags as to size, comprising a table including a horizontal top panel and legs supporting said top panel, a bar fixed to said top panel to overhang one side thereof and projecting forwardly therefrom and thence downwardly to provide a downwardly projecting end, a movable bar pivoted to said top panel to overhang said one end thereof and to swing about a vertical axis and projecting forwardly therefrom and thence downwardly to provide a downwardly projecting end, a pointer movably mounted on said top panel to swing about a vertical axis and traversing a scale, a link operatively connecting said movable bar and pointer whereby the size of the mouth of a bag held distended between said downwardly projecting ends of said fixed and movable bars is indicated on said scale by said pointer, and means yieldingly holding said fixed and movable bars apart.

3. Apparatus for sorting bags as to size, comprising a table including a horizontal top panel and legs supporting said top panel, a bar fixed to one lateral side of said top panel to overhang one side thereof and projecting forwardly therefrom and thence downwardly to provide a downwardly projecting end, a movable bar movably mounted on the other lateral side of said top panel to overhang said one side thereof and to move horizontally toward and from said fixed bar and projecting forwardly from said top panel and thence downwardly to provide a downwardly projecting end, a pointer movably mounted intermediate its ends near the center of said top panel to swing about a vertical axis, one end of said pointer traversing a scale on said top panel, means operatively connecting said movable bar and pointer whereby the size of the mouth of a bag held distended between the forward ends of said downwardly projecting ends of said fixed and movable bars is indicated on said scale by said pointer, and means yieldingly holding said downwardly projecting ends of said fixed and movable bars apart.

4. Apparatus for sorting bags as to size, comprising a table including a horizontal top panel having an arcuate edge and legs supporting said top panel, a bar fixed to one lateral side of said top panel to overhang one side thereof and projecting forwardly therefrom and thence downwardly to provide a downwardly projecting end, a movable bar movably mounted on the other lateral side of said top panel to overhang one side thereof and to move horizontally toward and from said fixed bar and projecting forwardly from said top panel and thence downwardly to provide a downwardly projecting end, said movable bar having a part arranged under said top panel, a pointer pivoted to the underside of said top panel near the center of said top panel to swing about a vertical axis and having an end traversing said arcuate edge of said top panel and a scale adjacent said arcuate edge, means arranged under said top panel and operatively connecting said part of said movable bar and pointer whereby the size of the mouth of a bag held distended between the forward ends of said downwardly projecting ends of said fixed and movable bars is indicated on said scale by said pointer, and means arranged under said top panel yieldingly holding said downwardly projecting ends of said fixed and movable bars apart.

5. Apparatus for sorting bags as to size, comprising a table including a horizontal top panel having an arcuate edge and legs supporting said top panel, a bar fixed to one lateral side of said top panel to overhang one side thereof and projecting forwardly therefrom, the forward end of said fixed bar extending downwardly, a movable bar movably mounted on the other lateral side of said top panel to overhang one side thereof and to move horizontally toward and from said fixed bar and projecting forwardly from said top panel, the forward end of said movable bar extending downwardly and said movable bar having a part arranged under said top panel, a pointer pivoted intermediate its ends below and near the center of said top panel to swing about a vertical axis and having one end traversing said arcuate edge of said top panel and a scale adjacent said arcuate edge, a link arranged under said top panel and operatively connecting said part of said movable bar with the other end of said pointer whereby the size of the mouth of a bag held distended between the downwardly extending ends of said fixed and movable bars is indicated on said scale by said pointer, and means arranged under said top panel and yieldingly holding said fixed and movable bars apart.

6. Apparatus for sorting bags as to size, comprising a table including a horizontal top panel and legs supporting said top panel, a bar fixed to said top panel and projecting outwardly from one side thereof and thence downwardly to provide a downwardly projecting end, a movable bar having a downwardly projecting end generally conforming to and adapted to coact with said downwardly projecting end of said fixed bar, means movably securing said movable bar to said top panel and guiding the downwardly projecting end thereof for movement toward and from said downwardly projecting end of said fixed bar and along the corresponding edge of said table top, a scale on said top panel, a pointer movably mounted on said top panel and traversing said scale, means operatively connecting said movable bar and pointer whereby the size of the mouth of a bag held distended between said downwardly projecting ends of said fixed and movable bars is indicated on said scale by said pointer, and means yieldingly holding said downwardly projecting ends of said fixed and movable bars apart.

7. Apparatus for sorting bags as to size, comprising a table including a horizontal top panel and legs supporting said top panel, a bar fixed to one lateral side of said top panel and projecting outwardly and thence downwardly therefrom to provide a downwardly projecting end, a movable bar having a downwardly projecting end generally conforming to and adapted to coact with said downwardly projecting end of said fixed bar, means movably securing said movable bar to said top panel and guiding the downwardly projecting end thereof for movement toward and from said downwardly projecting end of said fixed bar and along the corresponding edge of said table, a scale on said top panel, a pointer pivoted to the center of said top panel to swing about a vertical axis and traversing said scale, means operatively connecting said movable bar and pointer whereby the size of the mouth of the bag held distended between said downwardly projecting ends of said fixed and movable bars is indicated on said scale by said pointer, and means yieldingly holding said downwardly projecting ends of said fixed and movable bars apart.

8. Apparatus as set forth in claim 6 wherein said means movably securing said movable bar to said top panel and guiding the downwardly projecting end thereof comprises a track on said top panel and directed generally toward said fixed bar, a slide traversing said track, and means securing said movable bar to said slide.

9. Apparatus as set forth in claim 6 wherein said means movably securing said movable bar to said top panel and guiding the downwardly projecting end thereof comprises a track on said top panel and directed generally toward said fixed bar, a slide traversing said track, and means securing said movable bar to said slide, and wherein said means operatively connecting said movable bar and pointer comprises a link.

PIERCE GEO. STANLEY.

REFERENCES CITED

The following references are of record in the file of this patent:

UNITED STATES PATENTS

| Number | Name | Date |
|---|---|---|
| 188,803 | Kuhlman | Mar. 27, 1877 |
| 439,774 | Durand | Nov. 4, 1890 |
| 1,139,936 | Warner | May 18, 1915 |
| 1,325,943 | Howard | Dec. 23, 1919 |
| 1,485,365 | Bradbury | Mar. 4, 1924 |
| 1,634,156 | McCommon | June 28, 1927 |
| 1,950,912 | Aronson | Mar. 13, 1934 |
| 1,967,618 | Jazwieck | July 24, 1934 |
| 2,119,037 | Bauer | May 31, 1938 |
| 2,187,914 | Reitan | Jan. 23, 1940 |
| 2,274,275 | Phillips | Feb. 24, 1942 |